United States Patent [19]

Iizuka et al.

[11] Patent Number: 4,611,217
[45] Date of Patent: Sep. 9, 1986

[54] THERMAL TRANSFER COLOR GRADATION PRINTING APPARATUS

[75] Inventors: Jiro Iizuka, Tokyo; Takatoshi Kaneko, Machida; Tooru Hashiba, Tokyo, all of Japan

[73] Assignee: Victor Company of Japan Ltd., Japan

[21] Appl. No.: 683,030

[22] Filed: Dec. 18, 1984

[30] Foreign Application Priority Data

Dec. 20, 1983 [JP] Japan ................................ 58-240543

[51] Int. Cl.⁴ .................... G01D 15/10; B41J 3/20; H04N 1/46
[52] U.S. Cl. ................. 346/76 PH; 346/46; 400/120; 358/75; 358/298
[58] Field of Search ............... 346/46, 76 PH; 358/75, 358/298; 400/120

[56] References Cited

U.S. PATENT DOCUMENTS

| | | | |
|---|---|---|---|
| 4,251,822 | 2/1981 | Hara et al. | 346/139 C X |
| 4,368,491 | 1/1983 | Saito | 358/283 X |
| 4,378,566 | 3/1983 | Tsuhamura | 358/75 |
| 4,412,226 | 10/1983 | Yoshida | 346/1.1 X |
| 4,455,579 | 6/1984 | Tsukamura | 358/310 X |

*Primary Examiner*—E. A. Goldberg
*Assistant Examiner*—Gerald E. Preston
*Attorney, Agent, or Firm*—Andrus, Sceales, Starke & Sawall

[57] ABSTRACT

A thermal transfer type printing apparatus comprises a paper feeding mechanism, an ink ribbon traversing over a printing paper, a thermal printing head, a head moving mechanism, and a control circuit. The ink ribbon is divided into at least three colors in a width direction thereof and has first through third ink parts extending in a longitudinal direction thereof. The thermal printing head is arranged at such a location that the ink ribbon is interposed between the head and the printing paper. The head comprises first through third heating element groups respectively opposing the first through third ink parts of the ink ribbon, and the first through third heating element groups each has at least one heating element which is selectively heated depending on a color information signal which is indicative of a color picture or the like which is to be printed. The first through third heating element groups simultaneously print a plurality of different lines by use of the ink coated on the first through third ink parts. The operations of the paper feeding mechanism and the head moving mechanism are controlled by the control circuit.

7 Claims, 7 Drawing Figures

THERMAL TRANSFER COLOR GRADATION PRINTING APPARATUS

BACKGROUND OF THE INVENTION

The present invention generally relates to thermal transfer type printing apparatuses, and more particularly to a thermal transfer type printing apparatus which prints a color picture or the like with a desired gradation (tone).

Recently, it is common to obtain a digital signal by subjecting signals such as a color video signal and a color graphic signal which is obtained from a personal computer to an analog-to-digital (A/D) conversion, and supply the digital signal to a printing apparatus so as to print a color picture or graphics on a printing paper. Printing apparatuses may be roughly divided into impact type printing apparatuses and non-impact type printing apparatuses. An impact type printing apparatus generally comprises a head having a plurality of wire-dots, and the color picture or the like is printed on the printing paper when the wire-dots strike an ink ribbon or one of ink sheets placed on top of the printing paper. The ink ribbon is coated with ink of three colors, and the ink sheets are each coated with ink of one of the three colors. However, in the impact type printing apparatus, a large mechanical noise is generated during the printing operation due to the striking action of the wire-dots. Further, there is a disadvantage in that the resolution of the printed color picture or the like is low.

On the other hand, non-impact type printing apparatus may be roughly divided into ink-jet type printing apparatuses and thermal transfer type printing apparatuses. An ink-jet type printing apparatus generally comprises a head having a plurality of nozzles, and the color picture or the like is printed on the printing paper when ink of three colors, for example, is sprayed onto the printing paper from the nozzles. Compared to the impact type printing apparatus, the ink-jet type printing apparatus is advantageous in that only a small mechanical noise is generated during the printing operation. However, there is a disadvantage in that the nozzles are easily blocked by refuse of ink or the like which adheres to the nozzles.

A thermal transfer type printing apparatus comprises a thermal printing head. The color picture or the like is printed on the printing paper when the thermal printing head heats a single ink ribbon, one of ink ribbons, or one of ink films placed on top of the printing paper. The single ink ribbon is coated with ink of three colors at predetermined parts thereof, for example, the ink ribbons are each coated with ink of one of the three colors, and the ink sheets are each coated with ink of one of the three colors. Compared to the impact type printing apparatus, the thermal transfer type printing apparatus is advantageous in that only a small mechanical noise is generated during the printing operation. Moreover, the problem of the refuse of ink adhering on the nozzles and blocking the nozzles as in the case of the ink-jet type printing apparatus, will not occur in the thermal transfer type printing apparatus. However, according to the thermal transfer type printing apparatus, the thermal printing head first prints the entire picture or the like on the printing paper by using an ink film (a part of the single ink ribbon, or an ink ribbon) which is coated with ink of a first color among ink films (parts of the single ink ribbon, or ink ribbons) coated with ink of three colors, for example. Next, the thermal printing head prints the entire picture or the like on the printing paper which is already printed by use of the first color ink, by using an ink film which is coated with ink of a second color. Similarly, the thermal printing head prints the entire picture or the like on the printing paper which is already printed by use of the first and second color ink, by using an ink film which is coated with ink of a third color. In other words, the thermal printing head prints the entire picture or the like by only using one ink sheet at a time, that is, by only using ink of one color at a time. For this reason, when the thermal transfer type printing apparatus uses ink sheets which are respectively coated with ink of three colors, such a printing operation which employs one of the ink sheets must be performed three times.

Accordingly, when printing the color picture or the like in the thermal transfer type printing apparatus, the following operations (a) through (c) must be performed in order to print the entire picture or the like on the printing paper which is already printed by use of the first color ink, by using the ink film which is coated with the second color ink.

(a) Change the ink sheet which is coated with the first color ink with the ink sheet which is coated with the second color ink.

(b) Move and return the printing paper which is already printed by use of the first color ink back to an original position where the printing operation which uses the first color ink was started.

(c) Return the thermal printing head back to an original printing start position.

Operations similar to the above operations (a) through (c) are also performed when the thermal printing head prints the entire picture or the like on the printing paper which is already coated with the first and second color ink, by using the ink film which is coated with the third color ink. Hence, the thermal transfer type printing apparatus must be provided with a mechanism for changing an ink film with another ink film which is coated with ink of another color, and a mechanism for moving and returning the printing paper back to the original position. As a result, the cost of the thermal transfer type printing apparatus becomes high. In addition, the mechanism for moving and returning the printing paper back to the original position, must move and return the printing paper with a high positional accuracy. However, in actual practice, a slight error is introduced when the mechanism moves and returns the printing paper back to the original position, and errors are accordingly introduced in the printing positions. When such errors are introduced in the printing positions, it is not possible to obtain sharp contours of images in the printed color picture. Further, when the thermal transfer type printing apparatus uses ink sheets which are respectively coated with ink of three colors, a printing operation which employs one of the ink sheets must be performed with respect to the printing paper three times, and there is a problem in that it takes a long time to print a color picture or the like.

On the other hand, there are basically two methods of printing the picture or the like with a desired gradation (tone) in the thermal transfer type printing apparatus, and the two methods are determined by the kind of thermal printing head which is employed in the thermal transfer type printing apparatus.

A thermal printing head which comprises a heating dot element having an area which is the same as the area of one picture element, is used according to a first method of printing with the desired gradation. According to this first method, the heating area of the heating dot element is controlled by controlling the voltage or the like which is applied to the heating dot element, so as to print one picture element with the desired gradation. However, it is extremely difficult to linearly control the heating area of the heating dot element. For this reason, it is extremely difficult to print the picture or the like with the desired gradation by use of this conventional thermal printing head.

A thermal printing head which comprises a plurality of heating dot elements with respect to the area of one picture element, is used according to a second method of printing with the desired gradation. According to this second method, the heating dot elements are selectively heated so as to print one picture element with the desired gradation. When printing one picture element with one gradation out of 64 possible gradations, for example, one picture element is described by a maximum of an $8 \times 8$ matrix of dots. In this case, it is necessary to employ a thermal printing head having 8 heating dot elements arranged in a vertical row, and the printing with respect to one picture element is completed when the 8 heating dot elements are selectively heated as the vertical row of 8 heating dot elements move in the horizontal direction by a distance of 8 heating dot elements. Accordingly, in the thermal printing head which is used in the second method, it is necessary to provide 8 times the number of heating dot elements required in the aforementioned thermal printing head which controls the heating area of the heating dot element, and the manufacturing cost of the printing apparatus becomes high. Further, since the printing with respect to one picture element is carried out while the thermal printing head moves in the horizontal direction by a distance of 8 heating dot elements, the time it takes to print one picture element is 8 times longer than the time required in the aforementioned thermal printing head which controls the heating area of the heating dot element.

SUMMARY OF THE INVENTION

Accordingly, it is a general object of the present invention to provide a novel and useful thermal transfer type printing apparatus in which the problems described heretofore are eliminated.

Another and more specific object of the present invention is to provide a thermal transfer type printing apparatus which comprises an ink ribbon having ink parts which are coated with ink of at least three colors, and a thermal printing head having first through third heating resistor element groups, and prints a color picture or the like on a printing paper by simultaneously using the ink of at least three colors coated on the ink parts of the ink ribbon. According to the printing apparatus of the present invention, it is possible to considerably reduce the time which is required to print the color picture or the like on the printing paper, compared to a conventional printing apparatus which prints a color picture or the like on a printing paper by only using one ink sheet at a time, that is, by only using ink of one color at a time.

Still another object of the present invention is to provide a thermal transfer type printing apparatus in which the thermal printing head comprises first through n-th heating resistor elements with respect to one printing line, where n is an integer, and an i-th heating resistor element has an area of $M/2^i$ when a total area of one picture element is represented by M, where i is an arbitrary integer. According to the printing apparatus of the present invention, it is possible to carry out a printing operation with one gradation out of a large number of possible gradations, by use of the thermal printing head which comprises a small number of heating resistor elements. In addition, it is possible to stably and linearly control the gradation with which the printing is to be carried out.

Other objects and further features of the present invention will be apparent from the following detailed description when read in conjunction with the accompanying drawings.

DETAILED DESCRIPTION

Figure 1:
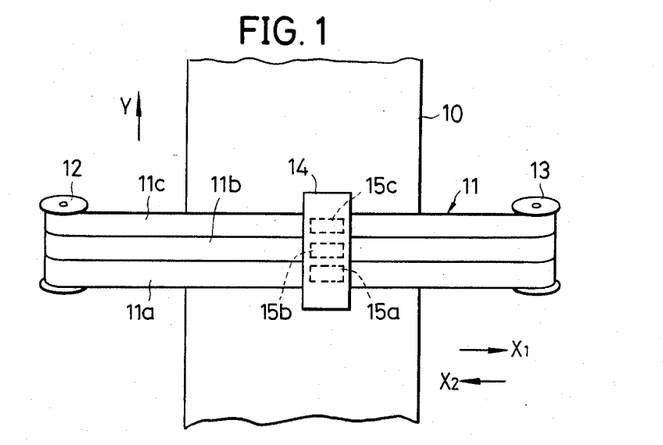
FIG. 1 shows positional relationships of a thermal printing head, an ink ribbon, and a printing paper in an embodiment of a thermal transfer type printing apparatus according to the present invention.

In FIG. 1, a printing paper 10 is fed in the direction of an arrow Y in terms of one line, by a paper feeding mechanism (not shown). An ink ribbon 11 is provided between reels 12 and 13, so as to traverse over the printing paper 10. The ink ribbon 11 is divided into three colors in the width direction thereof, and comprises first through third ink parts 11a and 11c which extend along a longitudinal direction of the ink ribbon 11. The first ink part (hereinafter simply referred to as a yellow ink part) 11a is coated with yellow wax ink, the second ink part (hereinafter simply referred to as a magenta ink part) 11b is coated with magenta wax ink, and the third ink part (hereinafter simply referred to as a cyan ink part) 11c is coated with cyan wax ink. A thermal printing head (hereinafter simply referred to as a head) 14 is located on top of the ink ribbon 11, and is successively shifted in the direction of an arrow $X_1$ or $X_2$ by a head moving mechanism (not shown).

Figure 2:
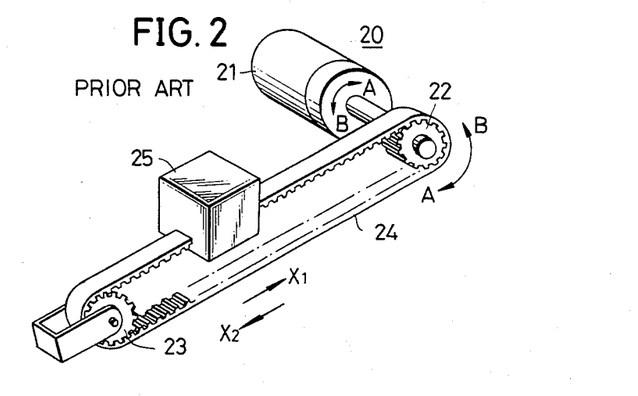
FIG. 2 shows an example of a head moving mechanism.

A known head moving mechanism 20 shown in FIG. 2, for example, may be used to successively shift the head 14. The head moving mechanism comprises a motor 21, a pulley 22 fixed to a rotary shaft of the motor 21, a pulley 23, a belt 24 provided across the pulleys 22 and 23, and a carriage 25. The head 14 is provided on the carriage 25. When the motor 21 rotates in the direction of an arrow A, the pulley 22 also rotates in the direction of the arrow A, and the carriage 25 is accordingly moved in the direction of the arrow $X_1$. Hence, by rotating the motor 21 in the direction of the arrow A in steps, it is possible to successively shift the head 14 which is provided on the carriage 25 in the direction of the arrow $X_1$ by one picture element. Similarly, the carriage 25 may be moved in the direction of the arrow $X_2$ by rotating the motor 21 in the direction of an arrow B.

The head 14 comprises a first heating resistor element group (hereinafter simply referred to as a first heating element group) 15a located at a position opposing the yellow ink part 11a of the ink ribbon 11, a second heating element group 15b located at a position opposing the magenta ink part 11b, and a third heating element group 15c located at a position opposing the cyan ink part 11c. As will be described later on in the specification, each of the first through third heating element groups 15a through 15c comprise a plurality of heating resistor elements (hereinafter simply referred to as heating elements), so that one picture element can be printed with one gradation out of a large number of gradations.

At the start of a printing operation, the head 14 assumes a printing start position which opposes a left end of the printing paper 10 in FIG. 1, for example. As the head 14 moves in the direction of the arrow $X_1$ from the printing start position and reaches a printing end position opposing a right end of the printing paper 10, the heating elements of the first heating element group 15a are selectively heated depending on the information which is to be printed. Accordingly, the yellow ink which is coated on the yellow ink part 11a is melted and is transferred onto the printing paper 10, and a first line is printed on the printing paper 10 by use of the yellow ink. Next, the printing paper 10 is fed in the direction of the arrow Y by one line by the paper feeding mechanism, and the head 14 is returned in the direction of the arrow $X_2$ back to the printing start position by the head moving mechanism. As the head 14 is again moved in the direction of the arrow $X_1$ from the printing start position and reaches the printing end position, the heating elements of the first and second heating element groups 15a and 15b are selectively heated depending on the information which is to be printed. As a result, the yellow ink which is coated on the yellow ink part 11a is melted and is transferred onto the printing paper 10, and a second line is printed on the printing paper 10 by use of the yellow ink. At the same time, the magenta ink which is coated on the magenta ink part 11b is melted and is transferred onto the printing paper 10, and the printing is performed by use of the magenta ink with respect to the first line which is already printed with the yellow ink. Next, the printing paper 10 is fed in the direction of the arrow Y by one line, and the head 14 is returned to the printing start position. Similarly thereafter, the printing operation is performed by simultaneously using the ink of three colors, and a color picture or the like is printed on the printing paper 10 with a desired gradation.

In the embodiment described heretofore, it is described for convenience' sake that the ink ribbon 11 is coated with ink of three colors. However, the ink ribbon 11 may be coated with ink of more than three colors. For example, the ink ribbon 11 may be coated with black ink, in addition to the yellow ink, magenta ink, and cyan ink. In addition, it is described for convenience' sake that the head 14 only prints as the head 14 moves in the direction of the arrow $X_1$. However, it is possible to reduce the printing time by designing the head 14 to also print as the head 14 moves in the direction of the arrow $X_2$. Further, it is described for convenience' sake that the heating elements of the second heating element group 15b prints by use of the magenta ink the first line which is already printed with the yellow ink, as the heating elements of the first heating element group 15a prints the second line by use of the yellow ink. However, in actual practice, it is difficult to arrange the first and second heating element groups 15a and 15b extremely close to each other. Moreover, problems occur when melting the ink in a vicinity of a border between the yellow ink part 11a and the magenta ink part 11b of the ink ribbon 11. Hence, in actual practice, the first and second heating element groups 15a and 15b (and the second and third heating element groups 15b and 15c) are separated from each other by several lines along the direction of the arrow Y.

Figure 3:
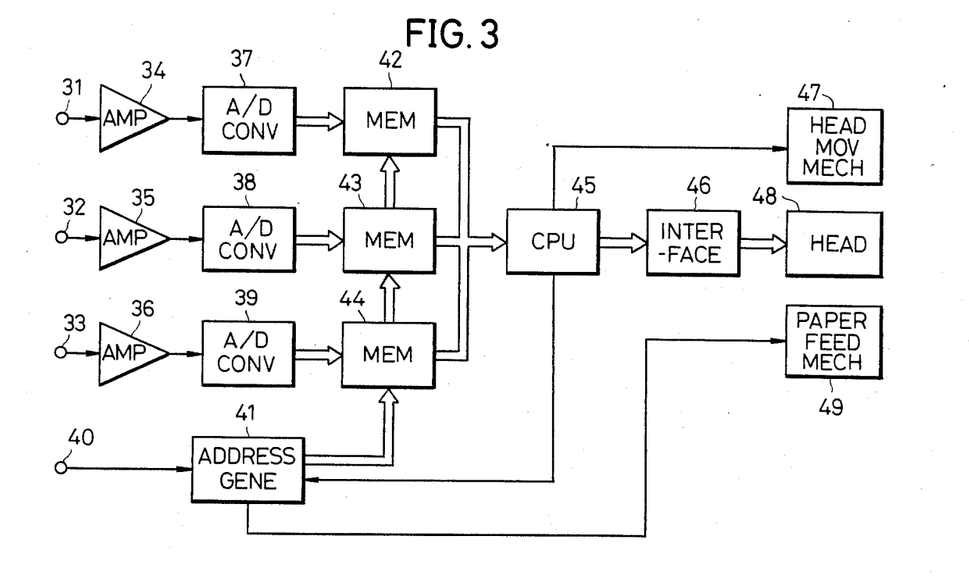
FIG. 3 is a general systematic block diagram showing an embodiment of a thermal transfer type printing apparatus according to the present invention.

FIG. 3 is a general systematic block diagram showing an embodiment of the thermal transfer type printing apparatus according to the present invention. A color video signal which is related to a color picture or the like which is to be printed with a desired gradation, is converted into a red signal (R-signal), a green signal (G-signal), a blue signal (B-signal), and synchronizing signals in a known signal processing circuit (not shown). The R-signal, the G-signal, and the B-signal are applied to respective input terminals 31 through 33, and are supplied to respective buffer amplifiers 34 through 36. Outputs of the buffer amplifiers 34 through 36 are supplied to respective analog-to-digital (A/D) converters 37 through 39 and are converted into binary digital data. On the other hand, the synchronizing signals are applied to an input terminal 40 and is supplied to an address generating circuit 41. The address generating circuit 41 is controlled responsive to an output of a central processing unit (CPU) 45, and designates write-in addresses and read-out addresses within memories 42 through 44. Digital data (hereinafter referred to as RGB digital data) which are related to the R-signal, the G-signal, and the B-signal, are obtained from the A/D converters 37 through 39 and are supplied to the memories 42 through 44. For example, the RGB digital data corresponding to one line or one picture are stored into the memories 42 through 44 at the write-in addresses designated by the address generating circuit 41. When the RGB digital data corresponding to one line or one picture are stored into the memories 42 through 44 and the printing apparatus assumes a printing mode, the address generating circuit 41 designates the read-out addresses within the memories 42 through 44 responsive to an output of the CPU 45, and the stored RGB digital data corresponding to one line or one picture are successively read out from the memories 42 through 44.

The RGB digital data read out from the memories 42 through 44 are supplied to the CPU 45 wherein the RGB digital data are subjected to a conversion depending on the arrangement of the heating elements of a thermal printing head 48, and further, the RGB digital data are converted into digital data (hereinafter referred to as YMC digital data) which are related to a yellow signal (Y-signal), a magenta signal (M-signal), and a cyan signal (C-signal). The YMC digital data obtained from the CPU 45 are supplied to the head 48 through an interface 46, and heating elements of the head 48 are selectively heated depending on the YMC digital data. An output of the CPU 45 is supplied to a head moving mechanism 47, so that the head moving mechanism 47 shifts the head 48 in the direction of the arrow $X_1$ in terms of one picture element. When the head 48 completes the printing of one line, a paper feeding mechanism 49 feeds the printing paper 10 in the direction of the arrow Y by one line responsive to an output of the address generating circuit 41. The operations described above are repeated, so as to print the color picture or the like with the desired gradation. The operation of the CPU 45 will be described in more detail later on in the specification.

Next, a description will be given with respect to the thermal printing head of the printing apparatus according to the present invention.

Figure 4:
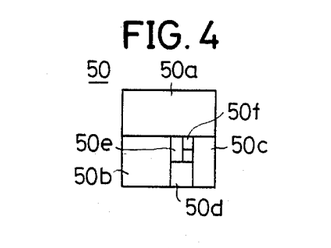
FIG. 4 is an enlarged view showing a method of dividing the area of one picture element into sections when printing one picture element with one gradation out of 64 possible gradations.

FIG. 4 is an enlarged view showing a method of dividing the area of one picture element 50 into sections when printing one picture element with one gradation out of 64 possible gradations, for example. When the total area of the one picture element 50 is represented by M, a first picture element part 50a has an area of M/2, and a second picture element part 50b has an area of M/4 which is ½ the area of the first picture element part 50a. A third picture element part 50c has an area of M/8 which is ½ the area of the second picture element part 50b. Similarly, fourth, fifth, and sixth picture element parts 50d, 50e, and 50f respectively have areas of M/16, M/32, and M/64.

Figure 5:
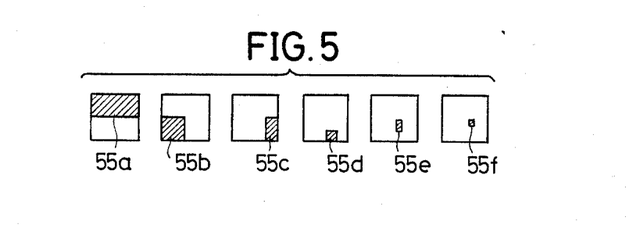
FIG. 5 shows the area and position of six heating resistor elements with respect to one picture element when printing one picture element with one gradation out of 64 possible gradations.

FIG. 5 shows the area and position of six heating elements with respect to one picture element when the printing one picture element with one gradation out of 64 possible gradations. In FIG. 5, the heating elements are indicated by hatchings. A heating element 55a has an area of M/2, and is used to print the first picture element part 50a of picture element 50 shown in FIG. 4. Similarly, heating elements 55b through 55f respectively have areas of M/4, M/8, M/16, M/32, and M/64, and are used to print respective picture element parts 50b through 50f of the picture element 50 shown in FIG. 4. It is possible to print one picture element with one gradation out of 64 possible gradations, by selectively heating the heating elements 55a through 55f and carrying out the printing with respect to the one picture element. For example, when printing the picture element 50 with the brightest gradation out of the 64 possible gradations, none of the heating elements 55a through 55f are heated, and the picture element 50 is printed as a blank. When printing the picture element 50 with the second brightest gradation out of the 64 possible gradations, only the heating element 55f which has the smallest area is heated. In other words, the remaining heating elements 55a through 55e are not heated, and only the heating element 55f carries out the printing with respect to the picture element part 50f of the picture element 50. On the other hand, when printing the picture element 50 with the darkest gradation out of the 64 possible gradations, all of the heating elements 55a through 55f are heated, and the heating elements 55a through 55f carry out the printing with respect to the respective picture element parts 50a through 50f of the picture element 50.

Figure 6:
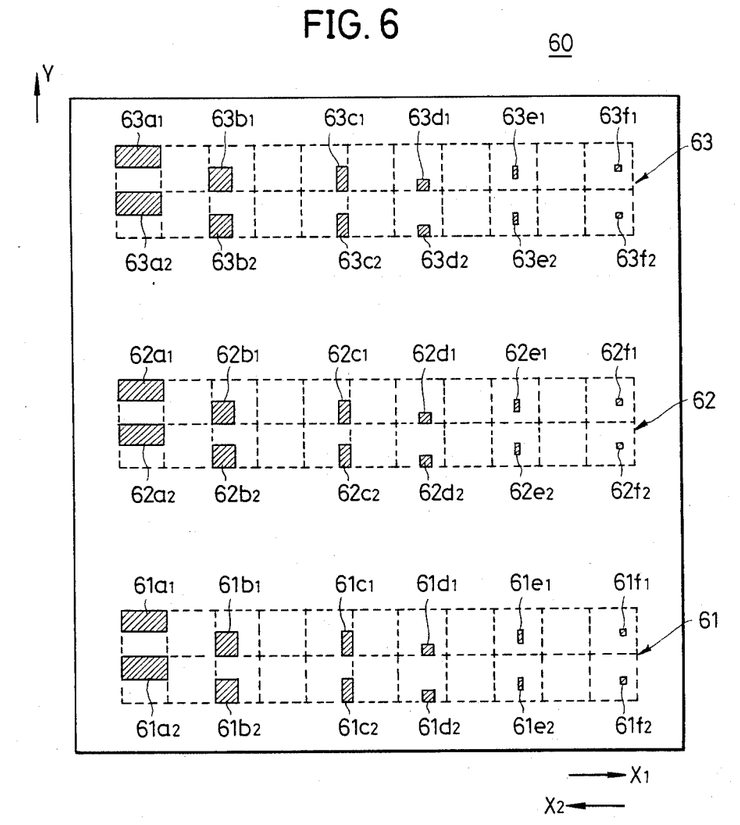
FIG. 6 shows an embodiment of a thermal printing head which is used in the thermal transfer type printing apparatus according to the present invention.

FIG. 6 shows an embodiment of a thermal printing head used in the printing apparatus according to the present invention. In FIG. 6, a thermal printing head 60 comprises first through third heating element groups 61 through 63. The first heating element group 61 comprises heating elements 61a1 through 61f1 and 61a2 through 61f2. Similarly, the second heating element group 62 comprises heating elements 62a1 through 62f1 and 62a2 through 62f2, and the third heating element group 63 comprises heating elements 63a1 through 63f1 and 63a2 through 63f2. The first through third heating element groups 61 through 63 of the head 60 are arranged so that the first heating element group 61 opposes the yellow ink part 11a of the ink ribbon 11, the second heating element group 62 opposes the magenta ink part 11b, and the third heating element group 63 opposes the cyan ink part 11c. In addition, the areas of the heating elements 61a1 through 61f1 are the same as the areas of the corresponding heating elements 55a through 55f shown in FIG. 5. In FIG. 6, the remaining heating elements are constructed similarly as the heating elements 61a1 through 61f1. Further, the widths of the ink parts 11a through 11c each correspond to five picture elements, for example.

At the start of the printing operation, the head 60 is located at the printing start position, and the heating element 61f1 is in a position to print the first picture element in the first line on the printing paper 10 by use of the yellow ink. In this state, the heating element 61f2 is in a position to print the first picture element in the second line on the printing paper 10 by use of the yellow ink. The head 60 is successively shifted in the direction of the arrow $X_1$ in terms of one picture element, and the printing of the first and second lines by use of the yellow ink is completed when the heating element 61a1 completes the printing of the first picture element in the first line and the heating element 61a2 completes the printing of the first picture element in the second line. When the printing of the first and second lines by use of the yellow ink is completed in this manner, the printing paper 10 is fed in the direction of the arrow Y by two lines.

According to the present embodiment, the heating elements provided with respect to the same line, that is, the heating elements 61a1 through 61f1, for example, are mutually separated from each other in the direction of the arrow $X_1$ by a spacing corresponding to one picture element. Such a spacing is required so that lead wires may be connected to the heating elements. The spacing may be an integral multiple of one picture element.

As described before, problems will occur when the ink in the vicinity of the border between two adjacent ink parts must be melted by the heating element. Hence, in the present embodiment, the first and second heating element groups 61 and 62 (and the second and third heating element groups 62 and 63) are mutually separated in the direction of the arrow Y by a distance corresponding to three lines. Thus, in the present embodiment, the heating element 62f1 prints the first picture element in the first line which is already printed with the yellow ink by use of the magenta ink, at the same time as when the heating element 61f1 prints the first picture element in the sixth line by use of the yellow ink. Similarly, the heating element 62f1 prints the first picture element in the sixth line which is already printed with the yellow ink by use of the magenta ink and the heating element 63f1 prints the first picture element in the first line which is already printed with the yellow and magenta ink by use of the cyan ink, at the same time as when the heating element 61f1 prints the first picture element in the eleventh line by use of the yellow ink.

In the present embodiment, the heating elements of the head 60, that is, the heating elements 61a1 through 61f1, for example, are arranged so that the area of the heating element which carries out the printing with respect to one picture element is multiplied by 2 as the head 60 is successively shifted in the direction of the arrow $X_1$. However, the heating elements may be arranged in the reverse sequence so that the heating element which carries out the printing with respect to one picture element is divided by 2 as the head 60 is successively shifted in the direction of the arrow $X_1$. Furthermore, the heating elements may be arranged at random. In other words, when the head 60 comprises first through n-th heating elements, where n is an integer, the area of an a k-th heating element needs to be $M/2^i$ when the total area of one picture element is represented by M, where i and k are arbitrary natural numbers between one and n, and moreover, the first through n-th heating elements need to be arranged at positions such that the printing areas of the first through n-th heating elements do not overlap when the first through n-th heating elements carry out the printing with respect to one picture element. In a case where the head 60 comprises i heating elements with respect to one printing line, it is possible to print one picture element with one gradation out of $2^i$ possible gradations.

Figure 7:
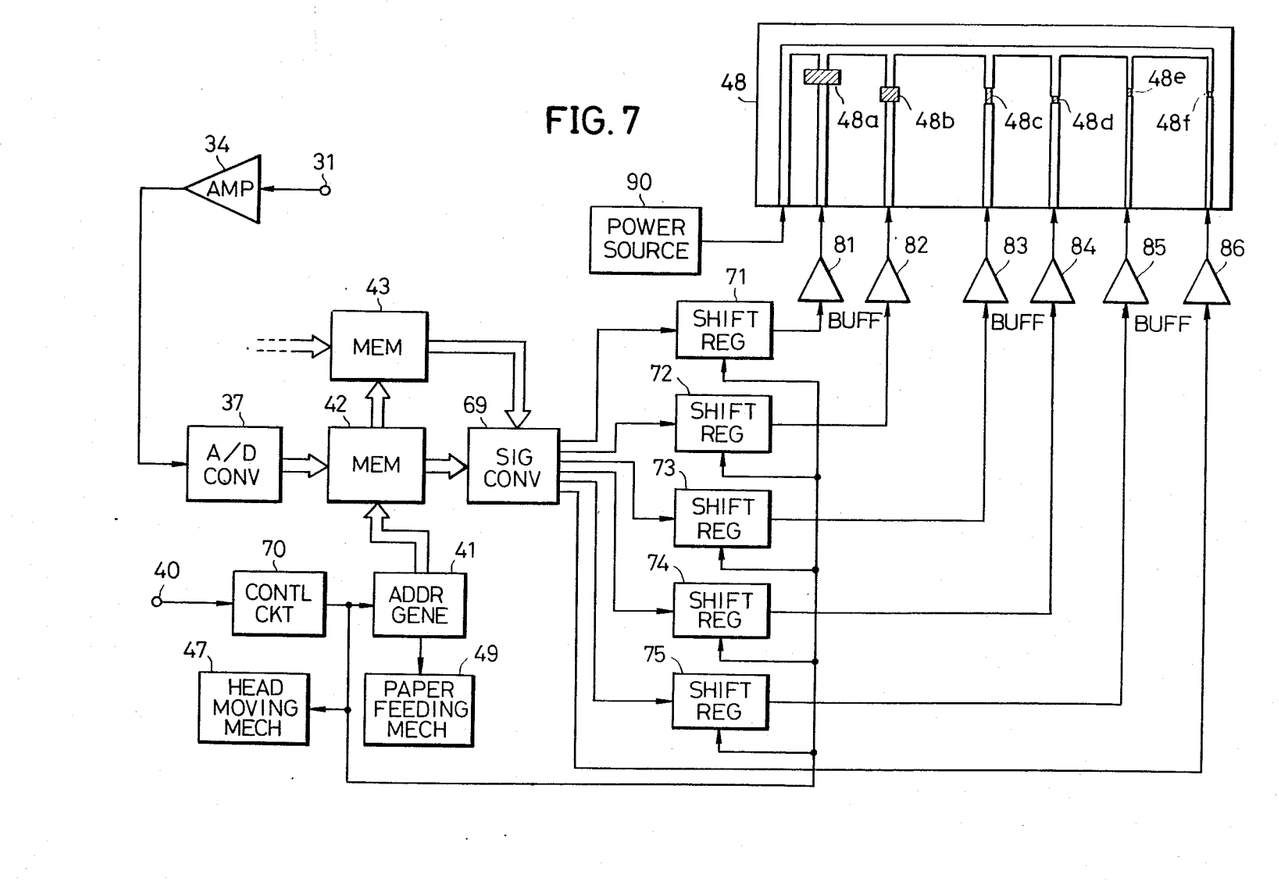
FIG. 7 is a general systematic block diagram for explaining the operation of a CPU in the block system shown in FIG. 3 with respect to the thermal printing head.

Next, a description will be given with respect to the operation of the CPU 45 shown in FIG. 3, by referring to FIG. 7. For convenience' sake, FIG. 7 only shows the circuit system for the Y-signal. In FIG. 7, those parts which are the same as those corresponding parts in FIG. 3 are designated by the same reference numerals, and their description will be omitted. Further, the illustration of the interface 46 is omitted in FIG. 7.

For convenience' sake, when it is assumed that the printing of one picture element is to be carried out with a desired gradation out of 64 possible gradations, the output digital data of the A/D converter 37 is a 6-bit signal.

In FIG. 7, a control circuit 70 constitutes a part of the CPU 45 shown in FIG. 3, together with a signal converter 69 and shift registers 71 through 75. The control circuit 70 controls the address generating circuit 41 responsive to the synchronizing signals applied to the input terminal 40. The 6-bit data read out from the memory 42, is a data related to the R-signal indicative of one picture element by one of 64 gradations. The 6-bit data which is related to the R-signal and is read out from the memory 42, and a 6-bit data which is related to the G-signal and is similarly read out from the memory 43, are supplied to the signal converter 69 and are converted into a 6-bit data which is related to the Y-signal.

The head 48 comprises heating elements 48a through 48f which are arranged similarly as the heating elements $61a1$ through $61f1$ shown in FIG. 6. The heating elements 48a through 48f perform the printing by use of the yellow ink. In FIG. 7, the illustration of heating elements for performing the printing by use of magenta ink and cyan ink are omitted. Further, for convenience' sake, it is assumed that the head 48 only prints one line at a time by use of the yellow ink. Each of the heating elements 48a through 48f has one end commonly connected to each other and coupled to a power source 90. The other ends of the heating elements 48a through 48f are connected to output terminals of respective buffers 81 through 86. The head 48 is shifted in terms of one picture element by the head moving mechanism 46 which operates responsive to an output signal of the control circuit 70. For example, the head 48 is shifted by one picture element when the control circuit 70 supplies one pulse to the head moving mechanism 47. A printing paper (not shown) on which the picture or the like is to be printed, is fed in terms of one line by the paper feeding mechanism 49 which operates responsive to an output signal of the address generating circuit 41. For example, when the printing with respect to one line is completed, the address generating circuit 41 generates one pulse, and the paper feeding mechanism 49 feeds the printing paper by one line responsive to this output pulse of the address generating circuit 41.

The shift registers 71 through 75 are each designed to successively shift an input data responsive to an output signal of the control circuit 70. The shift registers 71 through 75 are 10-bit, 8-bit, 6-bit, 4-bit, and 2-bit shift registers, respectively.

The address generating circuit 41, the head moving mechanism 47, and the shift registers 71 through 75 respectively operate in synchronism with the output of the control circuit 70.

For convenience' sake, it will be assumed that data corresponding to one line which contains 512 picture elements, are stored in the memories 42 and 43. In this case, the address generating circuit 41 first designates the addresses within the memories 42 and 43 where the data (R-signal data and G-signal data) related to the first picture element in the one line are stored. Accordingly, a 6-bit data related to the first picture element, is read out from each of the memories 42 and 43. The 6-bit R-signal data read out from the memory 42 and the 6-bit G-signal data read out from the memory 43, are supplied to the signal converter 69 wherein the two 6-bit data are converted into a single 6-bit data related to the Y-signal. A signal of a first bit of the 6-bit Y-signal data which is obtained from the signal converter 69, is supplied to the heating element 48f through the buffer 86. Hence, the heating element 48f is heated, for example, and the printing operation of the heating element 48f with respect to the first picture element by use of the yellow ink is completed. In this state, signals of the remaining second through sixth bits of the 6-bit Y-signal data which is obtained from the signal converter 69, are supplied to the respective shift registers, 75, 74, 73, 72, and 71. For this reason, no signals are applied to the heating elements 48a through 48e.

Next, the control circuit 70 produces a first pulse, and the head moving mechanism 47 shifts the head 48 by one picture element in the direction of the arrow $X_1$ in FIG. 1 responsive to this first pulse. In addition, the address generating circuit 41 increments the read-out addresses by one responsive to the first pulse from the control circuit 70. The shift registers 75, 74, 73, 72, and 71 respectively shift the signals of the second through sixth bits of the 6-bit Y-signal data which is related to the first picture element, responsive to the first pulse from the control circuit 70, and at the same time, the shift registers 75, 74, 73, 72, and 71 enter signals of second through sixth bits of a 6-bit Y-signal data which is related to a second picture element in the same line and is obtained from the signal converter 69. A signal of the remaining first bit of the 6-bit Y-signal data which is related to the second picture element, is supplied to the heating element 48f through the buffer 86, and thus, the heating element 48f carries out the printing with respect to the second picture element by use of the yellow ink.

Similarly thereafter, the heating elements 48a through 48f carry out the printing with respect to each picture element in the same line by use of the yellow ink. The heating element 48e carries out the printing with respect to the first picture element by use of the yellow ink when the control circuit 70 produces a second pulse. This is because the shift register 75 produces the signal of the second bit of the 6-bit Y-signal data which is related to the first picture element, responsive to the second pulse which is produced from the control circuit 70. Therefore, the heating element 48a carries out the printing with respect to the first picture element 5 by use of the yellow ink when the control circuit 70 produces a tenth pulse, and at this point in time, the heating element 48f carries out the printing with respect to a tenth picture element in the same line by use of the yellow ink.

As is clear from the description given heretofore, the printing of one line which contains 512 picture elements by use of the yellow ink is completed when the control circuit 70 produces a 522-nd ($=512+10$) pulse, that is, when the heating element 48a completes the printing with respect to a 512-th picture element by use of the yellow ink. When the printing of one line by use of the yellow ink is completed in this manner, the paper feeding mechanism 49 feeds the printing paper by one line in the direction of the arrow Y in FIG. 1 responsive to an output signal of the address generating circuit 41. Further, the head moving mechanism 47 moves the head 48 in the direction of the arrow $X_2$ responsive to an output signal of the control circuit 70, so as to return the head 48 to the original printing start position. The printing apparatus is then ready to carry out the printing with respect to the next line by use of the yellow ink. One picture containing a plurality of lines may be printed by use of the yellow ink, by repeating the operations described heretofore.

As described before, FIG. 7 only shows the circuit system for the Y-signal. However, circuit systems for the M-signal and the C-signal are actually provided in the printing apparatus. Accordingly, the printing which uses the yellow ink, the printing which uses the magenta ink, and the printing which uses the cyan ink, are actually performed simultaneously.

As described before, it is not essential to return the head 48 to the original printing start position when the head 48 is moved in the direction of the arrow $X_1$ and the printing with respect to one line by use of the yellow ink is completed, and the printing with respect to the next line by use of the yellow ink may be carried out as the head 48 is successively shifted by one picture element in the direction of the arrow $X_2$. In this case, the sequence with which the data are stored in the memories 42 and 43, or the sequence with which the data are read out from the memories 42 and 43, should be reversed for every other line.

One heating element is heated for approximately 1 msec, for example, and it takes approximately 2 msec for the head moving mechanism 47 to shift the head 48 by one picture element. Accordingly, when it is assumed that one line contains 512 picture elements as described before, it takes approximately 1566 ($=3\times 522$) msec to print one line by use of the ink of one color. For example, when one picture is represented by a $512\times 512$ matrix of picture elements (that is, 512 lines), it takes approximately 805 ($=1.566\times 512+1.566+1.566$) sec, that is, approximately 14 minutes, to print one picture by use of the ink of three colors. However, it would be impractical to spend such a long time to print one picture, and in reality, the printing apparatus is designed to simultaneously print a plurality of lines. For example, when the thermal printing head is designed to simultaneously print 16 lines by use of the ink of three colors, one picture can be printed within approximately 50 ($=805/16$) sec.

Further, the present invention is not limited to these embodiments, but various variations and modifications may be made without departing from the scope of the present invention.

What is claimed is:

1. A thermal transfer type printing apparatus comprising:

input terminal means for receiving color signals related to a color picture or the like which is to be printed with a desired gradation;

converting means for converting the color signals from said input terminal means into n-bit digital data, where n is a natural number greater than or equal to one;

a paper feeding mechanism responsive to a first signal for feeding in a first direction in terms of an integral multiple of one printing line a printing paper on which the color picture or the like is to be printed;

an ink ribbon traversing over said printing paper, said ink ribbon being divided into at least three colors in a width direction thereof and having a first through third ink parts extending in a longitudinal direction of said ink ribbon, said first through third ink parts being respectively coated with ink of first through third colors;

a thermal printing head arranged at such a location that said ink ribbon is interposed between said thermal printing head and said printing paper, said thermal printing head comprising first through third heating element groups respectively opposing said first through third ink parts of said ink ribbon, each of said first through third heating element groups comprising first through n-th heating elements which are selectively heated responsive to an n-bit digital datum from said converting means, a k-th heating element among said first through n-th heating elements having an area $M/2^i$ when a total area of one picture element is respresented by M, where each of k and i is a natural number which is selected from among one through n so that respective areas of said first through n-th heating elements are different from each other, said first through n-th heating elements being arranged substantially along a printing line at such positions that the areas of said first through n-th heating elements correspond to different picture element parts of one picture element in the printing line which is to be printed, said different picture element parts of said one picture element not overlapping with each other, said printing line extending in a second direction which is perpendicular to said first direction, said first through n-th heating elements performing a printing operation with respect to one picture element with one gradation out of $2^n$ possible gradations by melting the ink coated on a corresponding ink part among said first through third ink parts when selectively heated and transferring the melted ink onto said printing paper, said first through third heating element groups simultaneously printing a plurality of printing lines by use of the ink of first through third colors;

a head moving mechanism responsive to a second signal for shifting said thermal printing head in said second direction in terms of one picture element; and control means for supplying said second signal to said head moving mechanism every time at least one heating element out of said first through n-th heating elements in each of said first through third heating element groups completes a printing operation with respect to one picture element in one of said plurality of printing lines, and for supplying said first signal to said paper feeding mechanism every time said thermal printing head is successively shifted in said second direction from a printing start position on one printing line and reaches a printing end position on the same one printing line.

2. A printing apparatus as claimed in claim 1 in which said first through n-th heating elements of each of said first through third heating element groups are distributed in terms of one picture element in said second direction, and the printing with respect to one picture element is performed by said first through n-th heating elements as said thermal printing head is successively shifted in said second direction in terms of one picture element.

3. A printing apparatus as claimed in claim 1 in which $k=i$ and said first through n-th heating elements of each of said first through third heating elements groups are arranged so that the printing with respect to one picture element is successively performed by said first through n-th heating elements in a sequence of the n-th, $(n-1)$-th, $(n-2)$-th, ..., second, and first heating elements such that a printing performed with respect to one picture element by a heating element having the smaller printing area always precedes a printing performed with respect to the same one picture element by a heating element having a larger printing area.

4. A printing apparatus as claimed in claim 1 in which n is equal to 6, and said thermal printing head performs the printing with respect to one picture element with one gradation out of 64 possible gradations.

5. A printing apparatus as claimed in claim 1 in which each of said first through third heating element groups prints m printing lines at the same time, where m is an integer, and each of said first through third heating element groups comprises said first through n-th heating elements for each of said m lines.

6. A printing apparatus as claimed in claim 1 in which said first through third colors are yellow, magenta, and cyan, respectively.

7. A printing apparatus as claimed in claim 6 in which said ink ribbon is divided into four colors in the width direction thereof and has a fourth ink part extending in the longitudinal direction of said ink ribbon, said fourth ink part is coated with black ink, and said thermal printing head comprises a fourth heating element group opposing said fourth ink part of said ink ribbon.

* * * * *